United States Patent
Yoshioka

(10) Patent No.: US 7,114,653 B2
(45) Date of Patent: Oct. 3, 2006

(54) IC CARD AND CARD READER

(75) Inventor: Kazuei Yoshioka, Nagano (JP)

(73) Assignee: Aruze Corporation, Tokyo (JP)

(*) Notice: Subject to any disclaimer, the term of this patent is extended or adjusted under 35 U.S.C. 154(b) by 0 days.

(21) Appl. No.: 10/506,352

(22) PCT Filed: Mar. 11, 2002

(86) PCT No.: PCT/JP02/02263

§ 371 (c)(1),
(2), (4) Date: Apr. 4, 2005

(87) PCT Pub. No.: WO03/077195

PCT Pub. Date: Sep. 18, 2003

(65) Prior Publication Data

US 2005/0173531 A1   Aug. 11, 2005

(51) Int. Cl.
*G06K 7/08* (2006.01)
(52) U.S. Cl. .................. 235/451; 235/450; 235/453; 235/492
(58) Field of Classification Search ........ 235/450–453, 235/492
See application file for complete search history.

(56) References Cited

U.S. PATENT DOCUMENTS

| | | | |
|---|---|---|---|
| 4,971,285 A * | 11/1990 | Bechu | 248/634 |
| 5,436,441 A * | 7/1995 | Inoue | 235/487 |
| 5,880,934 A * | 3/1999 | Haghiri-Tehrani | 361/737 |
| 5,917,177 A * | 6/1999 | Owa et al. | 235/486 |
| 5,926,110 A * | 7/1999 | Downs et al. | 340/10.51 |
| 6,021,951 A * | 2/2000 | Nishikawa | 235/494 |
| 6,198,619 B1 * | 3/2001 | Fujioka | 361/328 |
| 6,255,725 B1 * | 7/2001 | Akagawa et al. | 257/679 |
| 6,412,702 B1 * | 7/2002 | Ishikawa et al. | 235/492 |
| 6,517,005 B1 * | 2/2003 | Ayala | 235/492 |
| 6,773,626 B1 * | 8/2004 | Sanada et al. | 252/299.01 |

FOREIGN PATENT DOCUMENTS

| | | |
|---|---|---|
| CA | 2240503 | 7/1997 |
| JP | 59-060783 | 4/1984 |
| JP | 63-9589 | 1/1988 |
| JP | 63-12082 | 1/1988 |
| JP | 63-39396 | 2/1988 |
| JP | 05-342426 | 12/1993 |
| JP | 06-150079 | 5/1994 |
| JP | 06-187514 | 7/1994 |

(Continued)

*Primary Examiner*—Kimberly D. Nguyen
(74) *Attorney, Agent, or Firm*—Leydig, Voit & Mayer, Ltd.

(57) ABSTRACT

An IC card according to the present invention is configured to be communicable with a card reader by receiving a high-frequency signal transmitted from the card reader through an antenna unit provided on an IC card body, rectifying the high-frequency signal to generate an operating voltage, and demodulating a modulating signal superimposed on the high-frequency signal. The antenna unit is composed of paired electrostatic coupling antennas spaced from each other. The paired electrostatic coupling antennas include metallic thin films arranged on a front surface of the IC card body separately from each other; and metallic thin films arranged on a back surface of the IC card body separately from each other. The metallic thin films are opposed to each other and connected to each other to form one of the paired electrostatic coupling antennas. The metallic thin films are opposed to each other and connected to each other to form the other of the paired electrostatic coupling antennas.

9 Claims, 4 Drawing Sheets

FOREIGN PATENT DOCUMENTS

| | | |
|---|---|---|
| JP | 411144015 A * | 5/1999 |
| JP | 2000-331137 | 11/2000 |
| JP | 2002-251594 | 6/2002 |

* cited by examiner

IC CARD AND CARD READER

TECHNICAL FIELD

The present invention relates to an IC card and a card reader configured to be accessible using a non-contact method.

BACKGROUND ART

In these types of the conventional IC card and the card readers accessible using a non-contact method, generally, an antenna coil is embedded in the IC card, and, in the card reader, an antenna coil is arranged so as to come close to the antenna coil within the IC card inserted into a card insertion slot.

With these conventional IC card and card reader, when the IC card is inserted in the card insertion slot of the card reader, the card reader detects insertion of the IC card, modulates a carrier signal with an access signal to generate a high-frequency signal, and then transmits the high-frequency signal to the IC card from the antenna coil.

On the other hand, the IC card receives with the embedded antenna coil the high-frequency signal transmitted from the antenna coil of the card reader, and then rectifies the received high-frequency signal to generate the access signal and direct-current voltage.

Subsequently, the IC card activates the direct voltage as operating power, and transmits answer back data for the access signal to the card reader. Mutual communications are thus performed between the card reader and the IC card.

DISCLOSURE OF THE INVENTION

The inventors examined the aforementioned conventional technology and found the following problem. Specifically, in the conventional IC card, for receiving the high-frequency signal and generating sufficient operating power, it is necessary to cause a resonant frequency, which is determined by the inductance of the antenna coil and the capacity of a resonance capacitor, to precisely match with the frequency of the high-frequency signal.

In this case, generally, the resonant frequency is adjusted by fine tuning the number of turns or the length of the antenna coil or by fine tuning the capacity of the resonance capacitor.

However, when the antenna coil is embedded and sealed in the thin IC card with a thickness of 0.8 to 0.9 mm, the inductance of the antenna coil widely varies.

Even if the antenna coil is manufactured on the assumption of a variation of the inductance when the antenna coil is embedded in the IC card, the assumed variation of the inductance and the actual variation thereof sometimes do not match each other when the antenna coil is embedded in the IC card.

In this case, the IC card whose resonant frequency does not match with the frequency of the high-frequency signal in a sealed state should be disposed of, which lowers yield of the IC card accordingly.

Therefore, the conventional IC card has a problem of escalating costs due to difficulty in manufacturing the antenna coil with highly accurate inductance.

The present invention was made to solve such a problem, and an object of the present invention is to provide an IC card capable of reducing costs and to provide a card reader accessible with the IC card.

An IC card according to the present invention is an IC card configured to be communicable with a card reader by receiving a high-frequency signal transmitted from the card reader through an antenna unit provided on an IC card body, rectifying the high-frequency signal to generate an operating voltage, and demodulating a modulating signal superimposed on the high-frequency signal. The antenna unit is composed of paired electrostatic coupling antennas spaced from each other. The paired electrostatic coupling antennas include first and second metallic thin films arranged on the front surface of or in the vicinity of the front surface of the IC card body separately from each other. Third and fourth metallic thin films arranged on the back surface of or in the vicinity of the back surface of the IC card body separately from each other. The first and third metallic thin films are opposed to each other and connected to each other to form one of the paired electrostatic coupling antennas. The second and fourth metallic thin films are opposed to each other and connected to each other to form the other of the paired electrostatic coupling antennas.

According to this IC card, the antenna unit is composed of the paired electrostatic coupling antennas spaced from each other. Therefore, the card reader and the IC card can surely and easily transmit and receive the high-frequency signal to and from each other only by providing the paired electrostatic coupling antennas on the card reader. As a result, the operation for adjusting the resonant frequency of the antenna unit can be eliminated, and the IC card can be manufactured extremely simply at low costs.

In addition, according to this IC card, the paired electrostatic coupling antennas composed of metallic thin films are provided on the front surface thereof or in the vicinity of the front surface, and are provided on the back surface thereof or in the vicinity of the back surface, thereby ensuring secure communications between the IC card and the card reader and making it possible to insert the IC card into the card insertion slot of the card reader regardless of the front surface and the back surface thereof, and regardless of the front side and the rear side thereof.

Preferably, each of the paired electrostatic coupling antennas is formed to have long sides in a longitudinal direction of the IC card body, and the paired electrostatic coupling antennas are arranged side by side in a width direction of the IC card.

According to this IC card, compared to the configuration in which antenna units are arranged side by side in the longitudinal direction of the IC card, there is less positioning accuracy required in inserting the IC card into the card insertion slot of the card reader. Accordingly, the card conveying mechanism of the card reader can be configured to be simple, and secure communications can be ensured between the IC card and the card reader.

In this case, preferably, the IC card includes a modulating circuit which amplitude-modulates the high-frequency signal, by varying load impedance between the paired electrostatic coupling antennas.

Providing the modulating circuit which amplitude-modulates the high-frequency signal as described above eliminates the need for transmission of the high-frequency signal from the IC card to the card reader, thus eliminating the need for providing an oscillating circuit for the IC card. Therefore, the circuitry of the IC card can be simplified, and product costs can be reduced.

In addition, power consumption can be reduced correspondingly to the simplification of the circuitry. Therefore, even if the degree of electrostatic coupling varies to some extent, it is possible to stably generate required operating voltage. Accordingly, it is possible to further stabilize mutual communications between the IC card and the card reader.

Further preferably, the IC card includes a rectifying circuit which rectifies the high-frequency signal to generate the operating voltage, and the modulating circuit is configured to vary the load impedance between the paired electrostatic coupling antennas, by varying load impedance at an output port of the rectifying circuit in synchronization with answer back data to the card reader.

As described above, the modulating circuit varies the load impedance between the paired electrostatic coupling antennas by varying the load impedance at the output port of the rectifying circuit in synchronization with the answer back data to the card reader. Therefore, the high frequency signal transmitted from the card reader can be surely amplitude-modulated with the simple configuration.

In addition, preferably, the paired electrostatic coupling antennas are formed on the front and back surfaces of the IC card body, and rust preventive coatings are provided on the front and back surfaces of the IC card body.

As described above, by the rust preventive coatings provided on the outer surfaces of the IC card body where the electrostatic coupling antennas are formed, corrosion of the electrostatic coupling antennas can be prevented even when rain water adheres to the IC card, thus improving the durability.

A card reader according to the present invention is a card reader configured to communicate with the aforementioned IC card. The card reader includes paired reader-side electrostatic coupling antennas arranged be opposed to any one of the front and back surfaces of the IC card inserted into an IC card insertion slot, and arranged to be able to be opposed to each of the paired electrostatic coupling antennas provided on any of the surfaces or in the vicinity of any of the front and back surfaces. The card reader is configured to transmit the high-frequency signal to the IC card through the paired reader-side electrostatic coupling antennas and the paired electrostatic coupling antennas on the IC card.

This card reader includes the paired electrostatic coupling antennas arranged to be opposed to any one of the front and back surfaces of the inserted IC card, and arranged to be able to be opposed to each of the paired electrostatic coupling antennas provided on any of the front and back surfaces or in the vicinity thereof. Therefore, it is possible to enhance the reliability of mutual communications between the card reader and the IC card with the simple configuration.

Another card reader according to the present invention is a card reader configured to communicate with the aforementioned IC card. The card reader includes one of reader-side electrostatic coupling antennas arranged to sandwich the first and third metallic thin films of the IC card inserted into an IC card insertion slot; and the other of the reader-side electrostatic coupling antennas arranged to sandwich the second and fourth metallic thin films of the IC card inserted into an IC card insertion slot. The card reader is configured to transmit the high-frequency signal to the IC card through the paired reader-side electrostatic coupling antennas and the paired electrostatic coupling antennas on the IC card.

This card reader includes one of the reader-side electrostatic coupling antennas arranged to sandwich the first and third metallic thin films of the inserted IC card, and the other of reader-side electrostatic coupling antennas arranged to sandwich the second and fourth metallic thin films of the inserted IC card. Therefore, it is possible to enhance the reliability of mutual communications between the IC reader and the IC card with the simple configuration.

At the same time, when the IC card is inserted into the card insertion slot of the card reader, the antennas of the IC card are opposed to the respective corresponding antennas of the card reader, thereby enhancing the electrostatic coupling. As a result, electric power can be efficiently supplied from the card reader to the IC card.

BEST MODE FOR CARRYING OUT THE INVENTION

Hereinafter, a description will be given of preferred embodiments of an IC card and a card reader according to the present invention.

Figure 1:
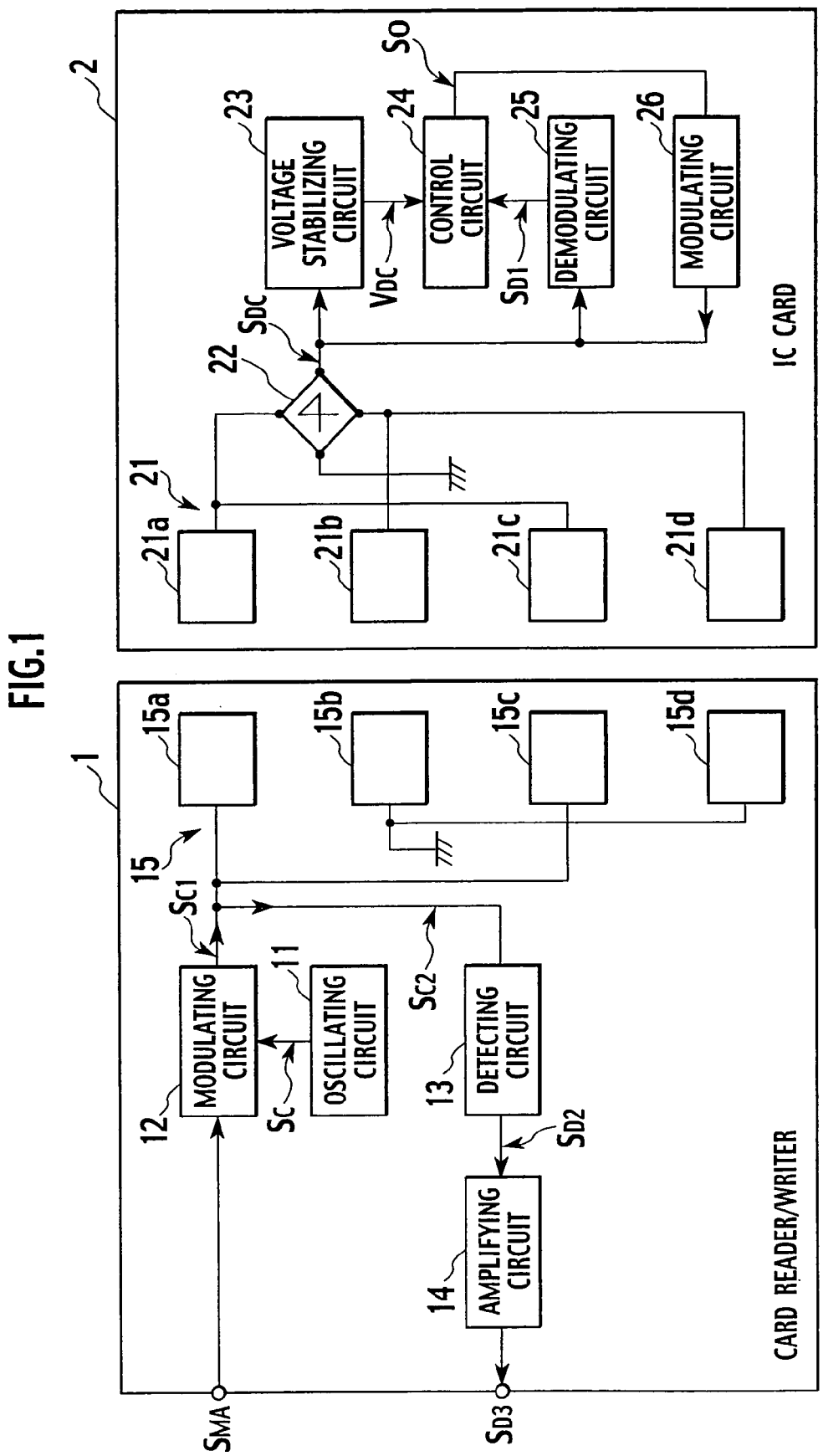
FIG. 1 is a block diagram of a card reader/writer 1 and an IC card 2.

A card reader/writer 1 corresponds to the card reader according to the present invention. As shown in FIG. 1, the card reader/writer 1 is configured to be capable of supplying electric power and accessing a later-described EEPROM within an IC card 2, by transmitting a high-frequency signal to the IC card 2 by means of an electrostatic coupling method.

Specifically, the card reader/writer 1 includes an oscillating circuit 11, a modulating circuit 12, a detecting circuit 13, an amplifying circuit 14, and an antenna unit 15.

In this case, in order to increase the degree of electrostatic coupling with the IC card 2, the oscillating circuit 11 generates a carrier (carrier signal) $S_C$ (see FIG. 4) with a higher frequency of, for example, 18 MHz, and outputs the carrier $S_C$ to the modulating circuit 12.

The modulating circuit 12 amplitude-modulates the carrier $S_C$ in synchronization with a modulating signal $S_{MA}$ (see FIG. 4) such as control data (an access signal) outputted from a personal computer (hereinafter, also referred to as a PC) arranged outside. In this case, the modulating signal $S_{MA}$ is composed of serial data with a duty ratio of 50%.

Figure 4:
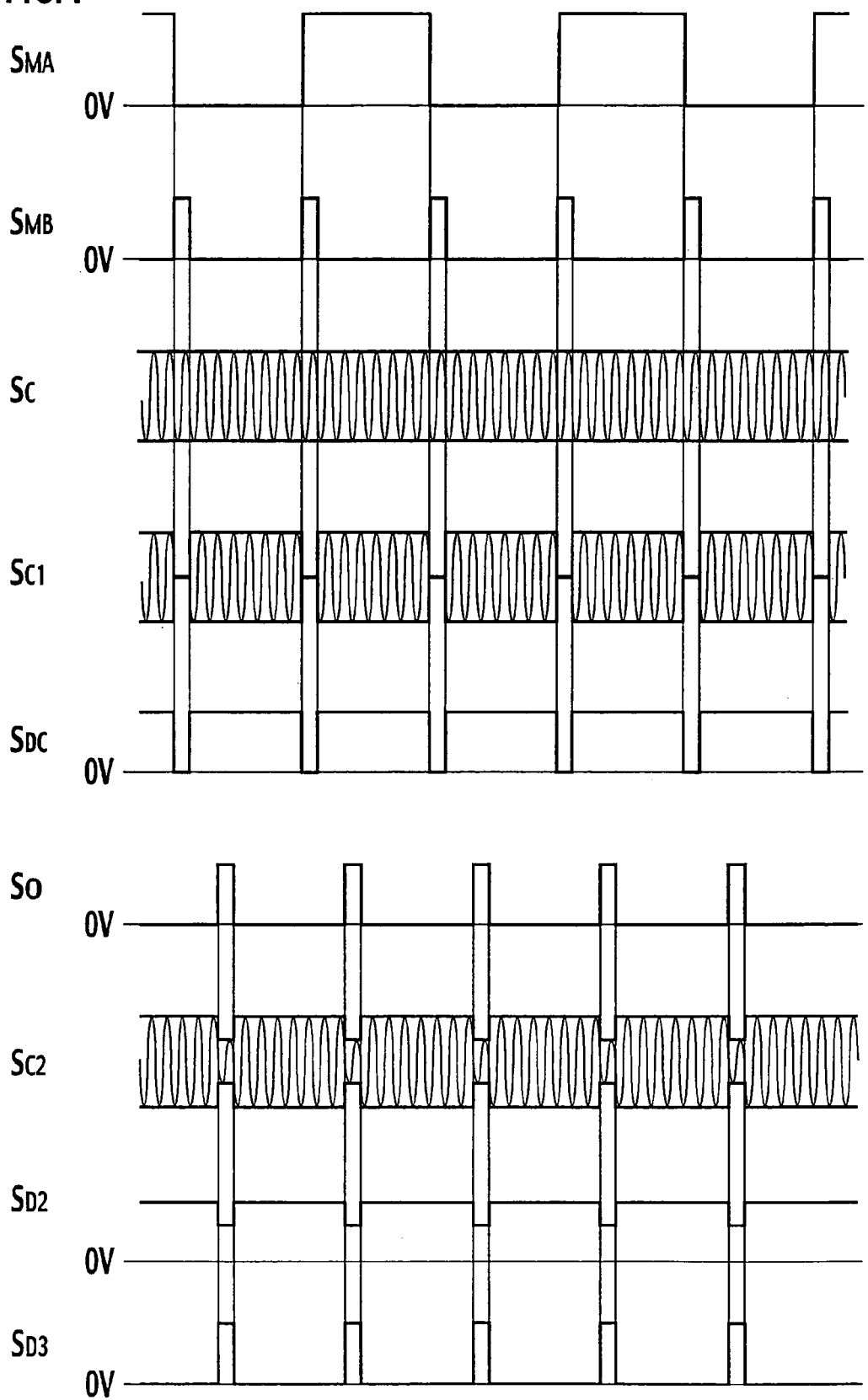
FIG. 4 is a diagram of signal waveforms at respective points in the card reader/writer 1 and the IC card 2.

To allow sufficient electric power to be generated in the IC card 2, the modulating circuit 12 therefore generates a modulating signal $S_{MB}$ (see FIG. 4) with a pulse width of, for example, 15 μs in synchronization with the modulating signal $S_{MA}$, and amplitude-modulates the carrier $S_C$ with the modulating signal $S_{MB}$, so as to generate a high-frequency signal $S_{C1}$ shown in FIG. 4.

The detecting circuit 13 rectifies a high-frequency signal $S_{C2}$ (see FIG. 4), which is obtained by amplitude-modifying the carrier $S_C$ by the IC card 2, so as to generate a demodulated signal $S_{D2}$ (see FIG. 4) as answer back data.

The amplifying circuit 14 is composed of, for example, an operational amplifier. The amplifying circuit 14 amplifies the demodulated signal $S_{D2}$, and outputs a demodulated signal $S_{D3}$ shown in FIG. 4 to the PC.

The antenna unit 15 includes electrostatic coupling antennas 15*a* and 15*c* (one of paired reader-side electrostatic coupling antennas) of non-contact type, and electrostatic coupling antennas 15b and 15d (the other of the reader-side electrostatic coupling antennas) of the same non-contact type.

The antennas 15a and 15c are connected to an output port of the modulating circuit 12, and the antennas 15b and 15d are connected to the ground potential (earth potential).

In the case where the modulating circuit 12 is configured to output the high-frequency signal $S_{C1}$ in a balanced system, the antennas 15a and 15c and the antennas 15b and 15d are connected to balanced lines, respectively. The structure of these antennas 15a to 15d is described later.

On the other hand, the IC card 2 is configured to include an antenna unit 21 for transmission and reception, a diode stack 22 as a rectifying circuit, a voltage stabilizing circuit 23, a control circuit 24, a demodulating circuit 25, and a modulating circuit 26.

Figure 2:
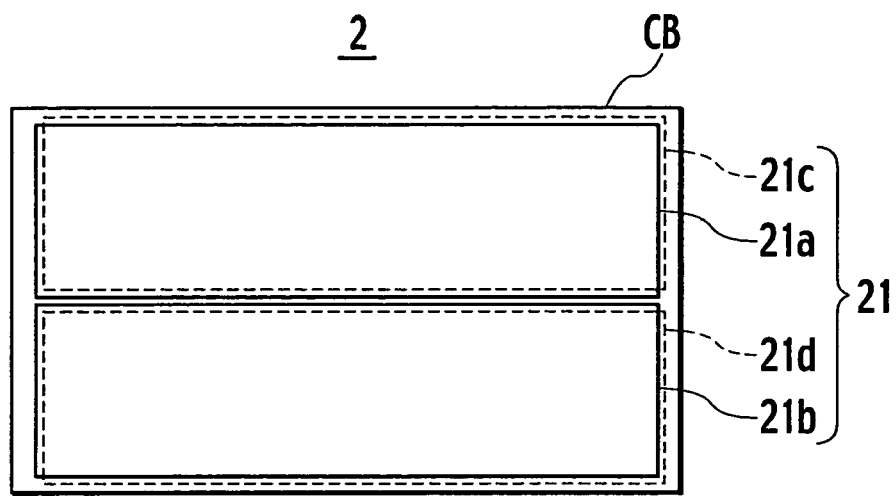
FIG. 2 is a plan view of the IC card 2.
Figure 3:
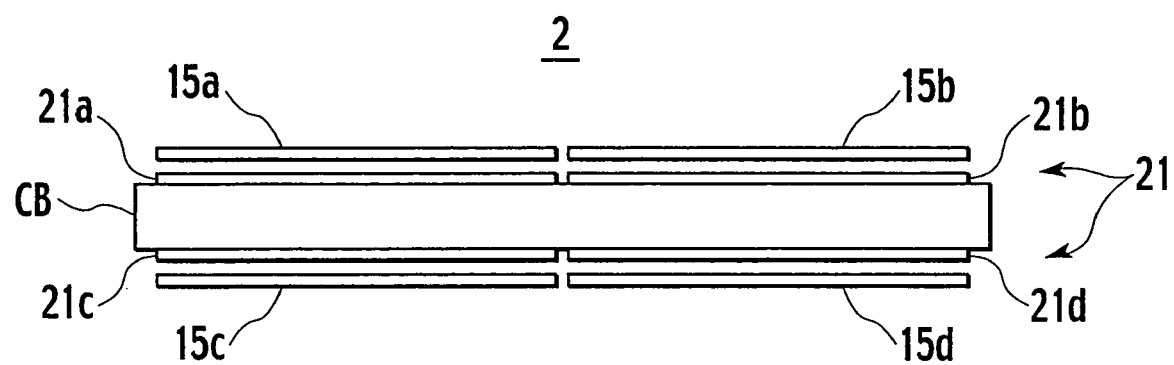
FIG. 3 is a side view showing positional relationships between respective antennas 21*a* to 21*d* of the IC card 2 and respective antennas 15*a* to 15*d* of the card reader/writer 1.

In this case, the antenna unit 21, as shown in FIGS. 2 and 3, is formed on both the front and back surfaces of an IC card body CB of the IC card 2.

Specifically, the antenna unit 21 is composed of four electrostatic coupling antennas 21a to 21d (a first metallic thin film, a second metallic thin film, a third metallic thin film, and a fourth metallic thin film of the present invention) which are formed into planar electrodes by depositing metal such as aluminum with a thickness of about several ten microns (for example, 15 μm) on both the front and back surfaces of the IC card body CB.

In this case, each of the antennas 21a and 21b is formed into nearly a rectangular shape with long sides in a longitudinal direction of the IC card body CB, and the antennas 21a and 21b are arranged side by side on the front surface of the IC card body CB in a width direction of the IC card body CB so as to be separated from each other with a small gap therebetween.

As is the case with the antennas 21a and 21b, each of the antennas 21c and 21d is formed into nearly a rectangular shape with long sides in the longitudinal direction of the IC card body CB, and the antennas 21c and 21d are arranged side by side in the width direction of the IC card body CB on the back surface of the IC card body CB so as to be separated from each other with a small gap therebetween and opposed to the antennas 21a and 21b with the IC card body CB interposed therebetween.

The antennas (one of the paired electrostatic coupling antennas) 21a and 21c are connected to each other by a short circuit within the IC card 2, and the antennas (the other of the paired electrostatic coupling antennas) 21b and 21d are connected to each other by a short circuit within the IC card 2.

On the other hand, each of the antennas 15a and 15d on the aforementioned card reader/writer 1 side is composed of, for example, a metallic thin plate (planar electrode) having substantially a same shape as that of the metallic thin film formed in the IC card 2. As shown in FIG. 3, the antennas 15a and 15c are arranged in parallel to be opposed to each other at such a distance apart that the IC card 2 can be inserted therebetween. The antennas 15b and 15d are similarly arranged in parallel to be opposed to each other at a distance apart which is equal to that between the antennas 15a and 15c.

In this case, the antennas 15a and 15b are arranged side by side on a same plane to be spaced from each other. The antennas 15c and 15d are also arranged side by side on a same plane to be spaced from each other.

Therefore, when the IC card 2 is inserted from the card insertion slot of the card reader/writer 1 and then inserted between the antennas 15a and 15c and between the antennas 15b and 15d, faces of the antennas 15a and 15c are opposed to faces of the antennas 21a and 21c (or 21b and 21d), respectively, and the antennas 15a and 15c sandwich the antennas 21a and 21c (or 21b and 21d).

Faces of the antennas 15b and 15d are also opposed to faces of the antennas 21b and 21d (or 21a and 21c), respectively, and the antennas 15b and 15d sandwich the antennas 21b and 21d (or 21a and 21c).

Accordingly, the electrostatic coupling between the antennas 21a and 21c (or 21b and 21d) of the inserted IC card 2 and the antennas 15a and 15c and the electrostatic coupling between the antennas 21b and 21d (or 21a and 21c) and the antennas 15b and 15d can be enhanced, and electric power can be efficiently supplied from the card reader/writer 1 to the IC card 2. In this case, the antenna 15a (or 15b) and antenna 21a (or 21b) are electrostatically coupled to each other at about 100 pF.

In order to prevent the antennas 21a to 21d from rusting, the IC card 2 has, for example, coatings (not shown) of resin on both the front and back surfaces where the antennas 21a to 21d are formed. Therefore, corrosion of the antennas 21a to 21d can be prevented even when rain water adheres to the IC card 2, and the durability can be improved.

The coatings of resin are formed to be thin so that the antenna 15a (or 15b) and the antenna 21a (or 21b) are well electrostatically coupled to each other.

The antennas 21a and 21b are arranged on the front surface of the IC card 2, and the antennas 21c and 21d are arranged on the back surface of the IC card 2. Therefore, the IC card 2 can be inserted into the card insertion slot regardless of the front surface and the back surface thereof. The antenna unit 21 surely receives the high-frequency signal $S_{C1}$ whichever of the surfaces of the IC card 2 is facing up when inserted.

Moreover, each of the antennas 21a to 21d is formed throughout almost the whole length of the IC card body CB along the longitudinal direction of the IC card body CB.

Therefore, the IC card 2 can be inserted into the card insertion slot regardless of the front side and the rear side thereof. Whichever of the side of the IC card 2 is inserted first, the antenna unit 21 surely receives the high-frequency signal $S_{C1}$.

Note that the antennas 21a and 21b may be arranged on only one of the front and back surfaces of the IC card 2, and the antennas 15a and 15b on one side are arranged on only one side in the card reader/writer 1.

However, when the IC card is inserted into the card insertion slot with any surface facing up, the antenna unit 15 and the antenna unit 21 are spaced by the thickness (0.8 to 0.9 mm) of the IC card.

Therefore, the electrostatic coupling between the antenna unit 15 and the antenna unit 21 is weakened, and the level of the high-frequency signal $S_{C1}$ received by the IC card 2 is lowered. Consequently, in order to generate sufficient operating power in the IC card 2 side, the aforementioned configuration of the IC card 2 is preferably adopted.

The IC card 2 is usually inserted into the card insertion slot in the longitudinal direction thereof, and then conveyed in the longitudinal direction within the card reader/writer 1 by a card conveying mechanism.

Therefore, in the case where the antennas 21a to 21d are arranged side by side in the longitudinal direction of the IC card 2, and the antennas 15a to 15d of the antenna unit 15 are arranged so that the faces of the antennas 15a to 15d are opposed to the faces of the antennas 21a and 21b (or 21c and 21d) of the IC card 2 inserted into the card insertion slot of the card reader/writer 1, when the IC card 2 is inserted into the card insertion slot, there may be a risk of the antennas 15a and 15c (or 15b and 15d) of the antenna unit 15 and the both antennas 21a and 21b (or 21c and 21d) of the antenna unit 21 to overlap each other to cause a short circuit.

In the case of adopting such a configuration, therefore, high alignment accuracy is required to prevent the antennas 15a and 15c (or 15b and 15d) from overlapping the both antennas 21a and 21b (or 21c and 21d) of the antenna unit 21.

Consequently, it is preferable to arrange the antennas 21a to 21d side by side in the width direction of the IC card 2.

The diode stack 22 generates a direct-current signal $S_{DC}$ shown in FIG. 4 by full-wave rectification of the high-frequency signal $S_{C1}$ transmitted by the card reader/writer 1, and then outputs the generated direct-current signal $S_{DC}$ to the voltage stabilizing circuit 23 and the demodulating circuit 25.

The voltage stabilizing circuit 23 stabilizes the direct-current signal $S_{DC}$, and supplies the direct-current voltage $V_{DC}$ as the operating power to the control circuit 24.

The control circuit 24 actually includes: a CPU configured to execute various types of processing; an EEPROM (Electrically Erasable PROM) configured to store various data, which are read or rewritten by the card reader/writer 1; a ROM configured to store operation programs of the CPU; and a RAM configured to temporarily store various data.

The demodulating circuit 25 demodulates the direct-current signal $S_{DC}$ into demodulated signal $S_{D1}$, and outputs the demodulated signal $S_{D1}$ to the control circuit 24. In this case, the waveform of the demodulated signal $S_{D1}$ becomes almost the same as that of the modulating signal $S_{MB}$.

Note that it is possible to employ a configuration where the direct-current signal $S_{DC}$ is outputted as the demodulated signal $S_{D1}$ to the control circuit 24, not providing the demodulating circuit 25.

The modulating circuit 26 short-circuits output ports of the diode stack 22 in synchronization with the output signal $S_0$ (see FIG. 4) as the answer back data, which is outputted from the control circuit 24, and thereby varies load impedance between the antennas 21a and 21c and the antennas 21b and 21d, so as to amplitude-modulate the carrier $S_C$ (that is, non-modulated high frequency signal $S_{C1}$) in the antenna 15a of the card reader/writer 1.

In this manner, the modulating circuit 26 configured to modulate the carrier $S_C$ eliminates the need for transmission of the carrier $S_C$ from the IC card 2 to the card reader/writer 1, thus eliminating the need for an oscillating circuit in the IC card 2. Therefore, the circuitry of the IC card 2 can be simplified, and product costs can be reduced.

In addition, power consumption can be reduced corresponding to the simplification of the circuitry. Therefore, even if the degree of electrostatic coupling varies to some extent, it is possible to stably generate required operating voltage. Accordingly, it is possible to further stabilize mutual communications between the IC card 2 and the card reader/writer 1.

Next, a description is given of communications processing of the card reader/writer 1 for the IC card 2 with reference to FIG. 4.

While the card reader/writer 1 is waiting for an access from the IC card 2, the modulating circuit 12 intermittently outputs, for example, the non-modulated high-frequency signal $S_{C1}$ to the antenna 15a, and at the same time, the antenna unit 15 intermittently outputs the high-frequency signal $S_{C1}$.

When the IC card 2 is then inserted into the card insertion slot, for example as shown in FIG. 3, the antennas 15a to 15d are opposed to the antennas 21a to 21d, respectively, and the antenna unit 21 thereby receives the high-frequency signal $S_{C1}$.

At this time, in the IC card 2, the voltage stabilizing circuit 23 outputs the direct-current voltage $V_{DC}$, which is obtained by stabilizing the direct-current signal $S_{DC}$ generated by the diode stack 22, to the control circuit 24.

Subsequently, the control circuit 24 outputs insertion confirmation data, which notifies the card reader/writer 1 of insertion of the IC card 2, as the output signal $S_0$ shown in FIG. 4, to the modulating circuit 26.

The modulating circuit 26 then short-circuits the output ports of the diode stack 22 in synchronization with the output signal $S_0$. That is, the modulating circuit 26 varies the load impedance of the diode stack 22.

As a result, the load impedance of the antenna unit 21 is varied, and the impedance at the output port of the modulating circuit 12 is then varied through the antenna unit 15. Therefore, the high-frequency signal $S_{C2}$ at the output port of the modulating circuit 12 is amplitude-modulated in synchronization with the output signal $S_0$ as the voltage waveform shown in FIG. 4.

Thereafter, the detecting circuit 13 detects the high-frequency signal $S_{C2}$, so as to generate the demodulated signal $S_{D2}$ shown in FIG. 4, and to output the demodulated signal $S_{D2}$ to the amplifying circuit 14.

The amplifying circuit 14 then outputs the demodulated signal $S_{D3}$ (see FIG. 4), which is obtained by amplifying the demodulated signal $S_{D2}$ with a predetermined gain, to the PC.

On the other hand, the PC which has detected insertion of the IC card 2 outputs access data for the IC card 2 to the card reader/writer 1 as the modulating signal $S_{MA}$ shown in FIG. 4.

At this time, the modulating circuit 12 generates the modulating signal $S_{MB}$ shown in FIG. 4 in synchronization with the modulating signal $S_{MA}$. The modulating circuit 12 then modulates the carrier $S_C$ (see FIG. 4) outputted from the oscillating circuit 11 with the modulating signal $S_{MB}$, so as to generate the high-frequency signal $S_{C1}$ shown in FIG. 4 and to output the high-frequency signal $S_{C1}$ to the antenna unit 15.

The high-frequency signal $S_{C1}$ is thus transmitted to the IC card 2 through the antenna units 15 and 21, which are electrostatically coupled to each other.

In the IC card 2, the diode stack 22 generates the direct-current signal $S_{DC}$ shown in FIG. 4 by full-wave rectification of the high-frequency signal $S_{C1}$, and outputs the generated direct-current signal $S_{DC}$ to the voltage stabilizing circuit 23 and the demodulating circuit 25.

Subsequently, the demodulating circuit 25 demodulates the direct-current signal $S_{DC}$ into the demodulated signal $S_{D1}$, and outputs the demodulated signal $S_{D1}$ to the control circuit 24.

The CPU within the control circuit 24 then rewrites balance information or the like recorded in the EEPROM or transfers customer information, the balance information, or the like to the card reader/writer 1, in accordance with the contents of the access data.

In addition, the CPU temporarily stores rewrite information, with which the balance information or the like is rewritten, into the RAM, when needed.

On the other hand, in transferring the customer information or the like, the CPU within the control circuit 24 outputs transfer data of the customer information or the like to the modulating circuit 26 as the output signal $S_0$ shown in FIG. 4.

At this time, the modulating circuit 26, in the same manner as the aforementioned operation, short-circuits the output ports of the diode stack 22 in synchronization with the output signal $S_O$.

As a result, the impedance of the output port of the modulating circuit 12 is varied through the antenna units 21 and 15. Therefore, the high-frequency signal $S_{C2}$ at the output port of the modulating circuit 12 is then amplitude-modulated in synchronization with the output signal $S_O$ as the voltage waveform shown in FIG. 4.

Subsequently, the detecting circuit 13 detects the high-frequency signal $S_{C2}$, so as to demodulate the demodulated signal $S_{D2}$ shown in FIG. 4.

Thereafter, the amplifying circuit 14 amplifies the demodulated signal $S_{D2}$, and then outputs the amplified demodulated signal $S_{D2}$ to the PC.

The customer information, the balance information, and the like are transferred to the PC in this manner.

As described above, according to these card reader/writer 1 and IC card 2, the antenna units 15 and 21 which can mutually transmit and receive the high-frequency signal by means of electrostatic coupling are used.

This can eliminate the operation for adjusting the resonant frequency of the antenna unit, thereby making it possible to manufacture the IC card 2 extremely simply at low costs, in comparison with the conventional method using antenna coils.

Figure 5:
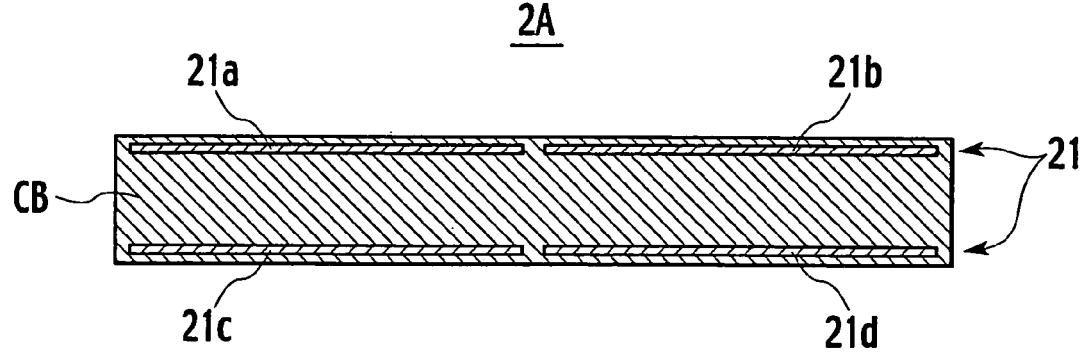
FIG. 5 is a cross-sectional view along a width direction of an IC card 2A.

In the first embodiment of the present invention, the description has been given regarding an example in which the antenna unit 21 is arranged on the front and back surfaces (or outer surfaces) of the IC card 2. However, as shown in FIG. 5, it is possible to arrange the antenna unit 21 within the IC card body CB of an IC card 2A, and to eliminate the use of a rust preventive coating.

In this configuration, it is preferable to arrange the antennas 21a and 21b in the vicinity of the front surface of the IC card body CB, and to arrange the antennas 21c and 21d in the vicinity of the back surface of the IC card body CB.

This allows these antennas 21a to 21d to come closer to the antenna unit 15 of the card reader/writer 1, thus ensuring good electrostatic coupling between the antennas 21a to 21d and the antenna unit 15 of the card reader/writer 1.

Figure 6:
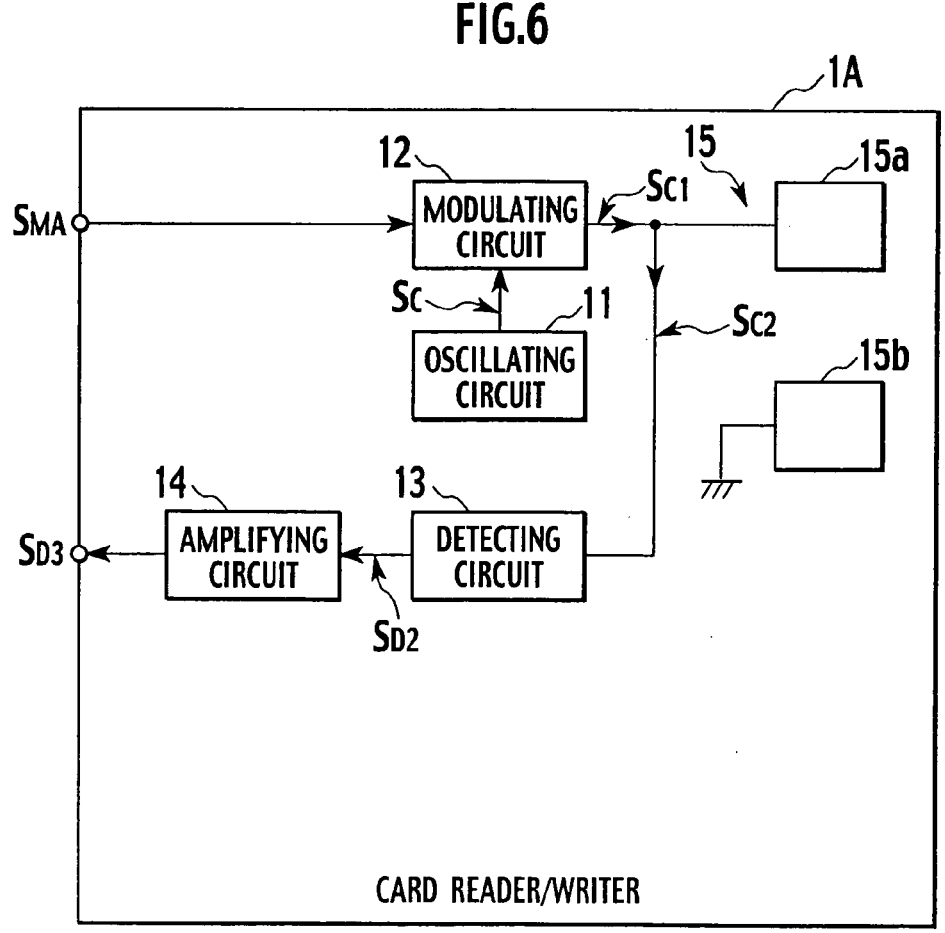
FIG. 6 is a block diagram of a card reader writer 1A.

Alternatively, as the card reader 1A shown in FIG. 6, it is possible to adopt a configuration where only the paired antennas 15a and 15b is arranged on the card reader 1A so as to be opposed to any one of the paired antennas 21a and 21b and the antennas 21c and 21d on the IC card 2 (2A). The same components thereof as those of the card reader/writer 1 are given the same reference numerals, and the redundant description is omitted.

The description has been given regarding the example using amplitude-modulation as the modulation method in communications between the card reader/writer 1 (1A) and IC card 2 (2A).

However, the modulation method itself is not limited, and it is possible to adopt various types of modulation methods such as phase modulation.

Furthermore, it is obvious that the configurations of the circuits of the card reader/writer 1 (1A) and the IC card 2 (2A) are not limited to the configurations shown in the embodiment of the present invention and can be appropriately modified.

INDUSTRIAL APPLICABILITY

As described above, with the IC card according to the present invention, the IC card is configured to communicate with the card reader by receiving a high-frequency signal transmitted from the card reader through the antenna unit provided on the IC card body, rectifying the high-frequency signal to generate the operating voltage, and demodulating a modulating signal superimposed on the high-frequency signal. The antenna unit is composed of electrostatic coupling antennas, and metallic thin films forming the electrostatic coupling antennas are provided in the front and back surface thereof.

Therefore, it is possible to implement the IC card which ensures secure communications between the IC card and the card reader and can be inserted into the card insertion slot regardless of the front and back surface thereof and regardless of the direction front and back side.

Moreover, with the card reader according to the present invention, the card reader includes paired reader-side electrostatic coupling antennas arranged to be opposed to the paired electrostatic coupling antennas of the above IC card, and is capable of transmitting the high-frequency signal to the IC card through the paired reader-side electrostatic coupling antennas and the paired electrostatic coupling antennas on the IC card side.

Therefore, it is possible to implement the card reader which can enhance the reliability of the mutual communications with the IC card with a simple configuration.

The invention claimed is:

1. An IC card communicating with a card reader by receiving a high-frequency signal transmitted from the card reader comprising:

an antenna unit provided on an IC card body, the IC card rectifying the high-frequency signal to generate an operating voltage, and demodulating a modulating signal superimposed on the high-frequency signal, wherein the antenna unit is composed of paired electrostatic coupling antennas spaced from each other;

the paired electrostatic coupling antennas comprise first and second metallic thin films arranged on a front surface of or in the vicinity of the front surface of the IC card body, separate from each other, and third and fourth metallic thin films arranged on a back surface of or in the vicinity of the back surface of the IC card body, separate from each other; and the first and third metallic thin films are opposed to each other and connected to each other to form one of the paired electrostatic coupling antennas; and the second and fourth metallic thin films are opposed to each other and connected to each other to form the other of the paired electrostatic coupling antennas.

2. The IC card according to claim 1, wherein each of the paired electrostatic coupling antennas includes long sides in a longitudinal direction of the IC card body, and the paired electrostatic coupling antennas are arranged side by side in a width direction of the IC card.

3. The IC card according to claim 2, further comprising a modulating circuit which amplitude-modulates the high-frequency signal by varying load impedance between the paired electrostatic coupling antennas.

4. The IC card according to claim 3, further comprising a rectifying circuit which rectifies the high-frequency signal to generate the operating voltage, wherein the modulating circuit varies the load impedance between the paired electrostatic coupling antennas, by varying load impedance at an output port of the rectifying circuit in synchronization with answer back data to the card reader.

5. The IC card according to claim 1, further comprising a modulating circuit which amplitude-modulates the high-frequency signal by varying load impedance between the paired electrostatic coupling antennas.

6. The IC card according to claim 5, further comprising a rectifying circuit which rectifies the high-frequency signal to generate the operating voltage, wherein the modulating circuit varies the load impedance between the paired electrostatic coupling antennasT by varying load impedance at an output port of the rectifying circuit in synchronization with answer back data to the card reader.

7. The IC card according to claim 1, wherein the paired electrostatic coupling antennas are located on the front and back surfaces of the IC card body, and rust preventive coatings are provided on the front and back surfaces of the IC card body.

8. A card reader communicating with the IC card according to claim 1, the card reader comprising paired reader-side electrostatic coupling antennas arranged to oppose any one of the front and back surfaces of the IC card when the IC card is inserted into an IC card insertion slot of the card reader, and arranged to oppose each of the paired electrostatic coupling antenna located on any of the front and back surfaces or in the vicinity of any of the front and back surfaces, wherein the card reader transmits the high-frequency signal to the IC card through the paired reader-side electrostatic coupling antennas and the paired electrostatic coupling antennas on the IC card.

9. A card reader communicating with the IC card according to claim 1, the card reader comprising:

first paired reader-side electrostatic coupling antennas arranged to sandwich the first and third metallic thin films of the IC card when the IC card is inserted into an IC card insertion slot of the card reader; and second paired reader-side electrostatic coupling antennas arranged to sandwich the second and fourth metallic thin films of the IC card, wherein the card reader transmits the high-frequency signal to the IC card through the paired reader-side electrostatic coupling antennas and the paired electrostatic coupling antennas on the IC card.

* * * * *